(12) United States Patent
Koga

(10) Patent No.: US 10,983,188 B2
(45) Date of Patent: Apr. 20, 2021

(54) OBJECT NOTIFICATION APPARATUS

(71) Applicant: DENSO CORPORATION, Kariya (JP)

(72) Inventor: Takeshi Koga, Kariya (JP)

(73) Assignee: DENSO CORPORATION, Kariya (JP)

( * ) Notice: Subject to any disclaimer, the term of this patent is extended or adjusted under 35 U.S.C. 154(b) by 363 days.

(21) Appl. No.: 15/769,273

(22) PCT Filed: Oct. 19, 2016

(86) PCT No.: PCT/JP2016/080990
§ 371 (c)(1),
(2) Date: Apr. 18, 2018

(87) PCT Pub. No.: WO2017/069162
PCT Pub. Date: Apr. 27, 2017

(65) Prior Publication Data
US 2018/0306889 A1    Oct. 25, 2018

(30) Foreign Application Priority Data

Oct. 19, 2015   (JP) .............................. JP2015-205792

(51) Int. Cl.
*G01S 3/80* (2006.01)
*G01S 3/808* (2006.01)
(Continued)

(52) U.S. Cl.
CPC .............. *G01S 3/8083* (2013.01); *B60R 1/00* (2013.01); *B60W 50/14* (2013.01); *G01S 7/527* (2013.01);
(Continued)

(58) Field of Classification Search
USPC ......................................................... 367/99
See application file for complete search history.

(56) References Cited

U.S. PATENT DOCUMENTS 6,741,186 B2 * 5/2004 Ross ....................... G01S 3/781
                                                   250/239
8,189,870 B2 * 5/2012 Fleury .................. B60W 40/02
                                                   382/103
(Continued)

FOREIGN PATENT DOCUMENTS

JP        2009-168600        7/2009
JP        2010-127717 A      6/2010
(Continued)

OTHER PUBLICATIONS

English Translation of JP 2010-127717 (27 pages) (Year: 2010).*
English Translation of JP-2010-281793 (27 pages) (Year: 2010).*

*Primary Examiner* — James R Hulka
(74) *Attorney, Agent, or Firm* — Maschoff Brennan

(57) ABSTRACT

An obstacle notification apparatus of the embodiment is mounted in a vehicle, and includes a probing result acquiring section that sequentially acquires reception intensity of a reflected wave corresponding to a probing wave reflected back by an object, the reflected wave being received by a probing wave transmitting and receiving apparatus transmitting the probing wave in a traveling direction of the vehicle and receiving the reflected wave; an obstacle determining section that determines whether or not an obstacle, which is an object presence of which a driver of the vehicle is to be notified of, is present in the traveling direction of the vehicle, by using the reception intensity of the reflected wave acquired by the probing result acquiring section; a notification processing section that performs a notification process for notifying the driver of the presence of the obstacle based on determination of the presence of the obstacle by the obstacle determining section; an image data acquiring section that acquires image data taken by a camera including, within an image taking range, an arrival range of the probing wave transmitted by the probing wave trans-
(Continued)

mitting and receiving apparatus; and a noise element detecting section that detects presence of a noise element by analyzing the image data acquired by the image data acquiring section, the noise element being an element which is able to reflect the probing wave and which is preset as an element of which the driver need not be notified. The obstacle determining section determines whether or not the obstacle is present by using a less easily satisfied condition in a case where the noise element detecting section has detected the noise element than that used in a case where the noise element detecting section has not detected the noise element.

10 Claims, 7 Drawing Sheets

(51) Int. Cl.
| | | |
|---|---|---|
| G08G 1/16 | (2006.01) | |
| G08G 1/0962 | (2006.01) | |
| G01S 15/931 | (2020.01) | |
| G01S 7/527 | (2006.01) | |
| G01S 15/86 | (2020.01) | |
| B60R 1/00 | (2006.01) | |
| B60W 50/14 | (2020.01) | |

(52) U.S. Cl.
CPC ............ *G01S 15/86* (2020.01); *G01S 15/931* (2013.01); *G08G 1/0962* (2013.01); *G08G 1/165* (2013.01); *G08G 1/166* (2013.01); *B60R 2300/30* (2013.01); *B60W 2420/42* (2013.01)

(56) References Cited

U.S. PATENT DOCUMENTS

| | | | |
|---|---|---|---|
| 9,053,554 B2* | 6/2015 | Uchida | G06K 9/00805 |
| 9,679,204 B2* | 6/2017 | Hegemann | G06K 9/00805 |
| 2003/0128106 A1* | 7/2003 | Ross | G01S 3/781 |
| | | | 340/435 |
| 2007/0075892 A1* | 4/2007 | Horibe | G01S 17/86 |
| | | | 342/70 |
| 2009/0103781 A1 | 4/2009 | Fleury et al. | |
| 2012/0069181 A1* | 3/2012 | Xue | G01J 3/447 |
| | | | 348/148 |
| 2013/0156337 A1* | 6/2013 | Kwon | G06K 9/40 |
| | | | 382/264 |
| 2014/0347448 A1 | 11/2014 | Hegemann et al. | |

FOREIGN PATENT DOCUMENTS

| | | |
|---|---|---|
| JP | 2010-281793 A | 12/2010 |
| JP | 2012-216125 | 11/2012 |
| JP | 2015-013501 A | 1/2015 |
| JP | 2015-135301 | 7/2015 |

* cited by examiner

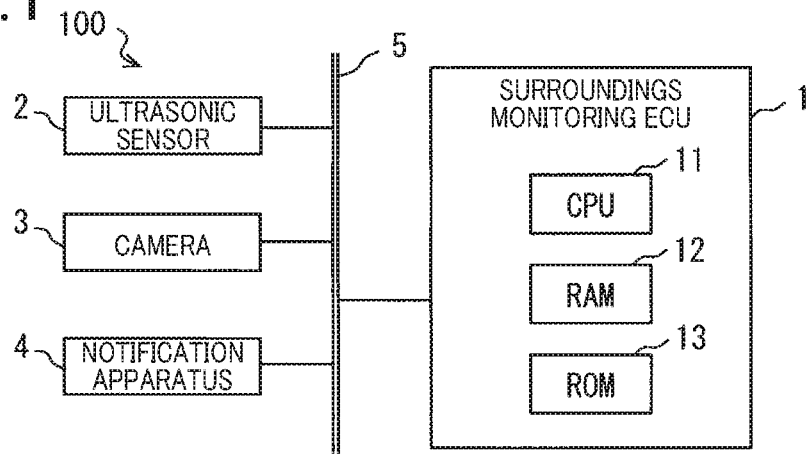
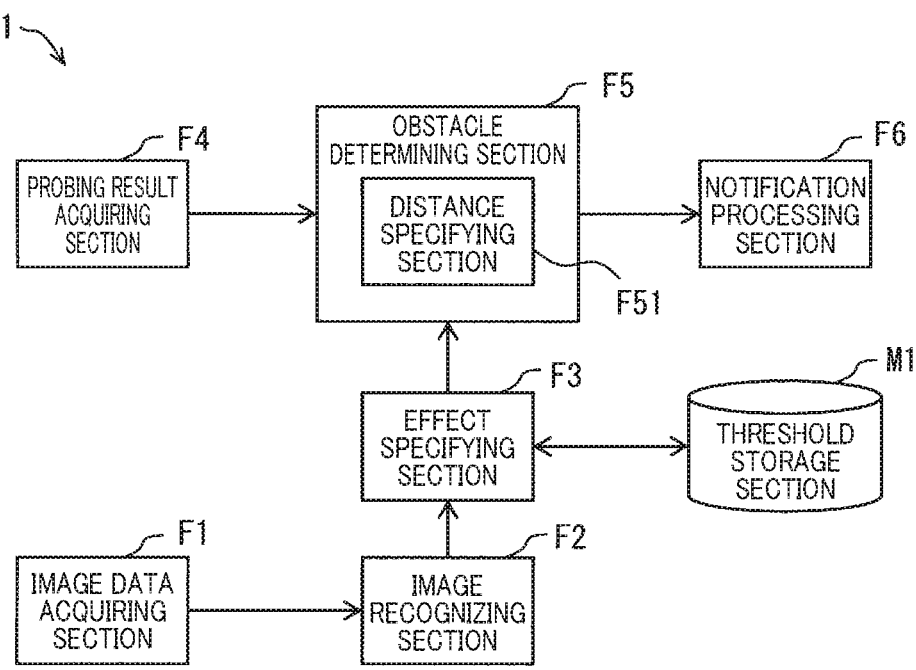
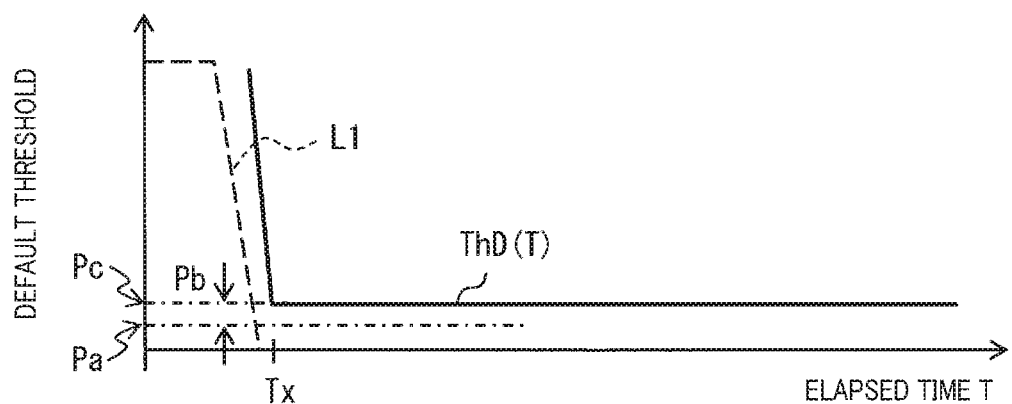

OBJECT NOTIFICATION APPARATUS

TECHNICAL FIELD

The present invention relates to an obstacle notification apparatus which notifies a driver of information on an obstacle present around a vehicle.

BACKGROUND ART

Conventionally, an apparatus (hereinafter, referred to as an obstacle notification apparatus) is known which detects an obstacle present in the traveling direction of a vehicle by transmission and reception of a predetermined probing wave, and informs a driver of the presence of the obstacle.

For example, an object notification apparatus disclosed in Patent Literature 1 detects a distance between a vehicle and an obstacle present in the traveling direction of the vehicle using an ultrasonic sensor which transmits and receives ultrasonic pulses serving as probing waves. Then, when the distance between the detected obstacle and the vehicle is shorter than a predetermined threshold value, an alert sound or the like is output to notify the driver of the presence of the obstacle. It is noted that the obstacle as used herein refers to, among various objects, an object the presence of which the driver has to be notified of. For example, an object large enough to prevent traveling of the vehicle may be assumed to be an obstacle.

For such an obstacle notification apparatus, in addition to the ultrasonic sensor, various sensors such as a millimeter-wave radar using millimeter waves (including submillimeter waves) as probing waves are used as a sensor configured to detect an obstacle (hereinafter, referred to as an obstacle sensor).

The obstacle sensor transmits a probing wave and receives a reflected wave reflected from an object present within an arrival range of the probing wave. If reception intensity of the received reflected wave exceeds a threshold value (hereinafter, referred to as a threshold value for determination) preset to determine that an obstacle is present, the obstacle sensor determines that an obstacle is present. Determining the presence of an obstacle corresponds to detection of the obstacle.

Determining whether or not any obstacle is present may be performed by the obstacle sensor itself or by an electronic control apparatus which is present outside the obstacle sensor and which acquires information indicative of the reception intensity from the obstacle sensor. For convenience of description, an obstacle determining section refers to a functional module provided in the obstacle sensor or the electronic control apparatus to determine whether or not any obstacle is present. The obstacle determining unit may be implemented as hardware using one or more ICs or by a CPU executing predetermined software.

CITATION LIST

Patent Document

[Patent Literature 1] JP-A-2015-13501

SUMMARY OF THE INVENTION

Technical Problem

A probing wave transmitted by the obstacle sensor returns to the obstacle sensor by being reflected not only by an obstacle but also by an object, the presence of which the driver essentially need not be informed of, such as a road surface (such an object is hereinafter referred to as a noise element). Thus, an excessively small threshold value for determination may increase the likelihood of an erroneous determination of the presence of an obstacle caused by a reflected wave from the noise element. On the other hand, an excessively large threshold value for determination may delay or preclude detection of an object, the presence of which the driver has to be notified of (in other words, the obstacle).

Thus, conventional obstacle notification apparatuses specify, through tests or the like, a value assumed to be the reception intensity of a reflected wave from a road surface with a uniform degree of inclination (hereinafter, referred to as an even road surface), and sets the threshold value for determination to a value which is unlikely to be exceeded by the reception intensity of a reflected wave from the even road surface. This is because, in a situation where the vehicle is present on an even road surface, the aspect as described above enables reduction in the risk that the obstacle determining unit erroneously determines that an obstacle is present based on the reflected wave from the even road surface.

However, an environment where the vehicle travels is not limited to even road surfaces. Points where the degree of inclination changes exist on the road on which the vehicle actually travels. If the vehicle is present before a point on a generally level road at which an upward slope begins, the obstacle determining section may erroneously determine the road surface of the upward slope to be an obstacle. The road surface of the upward slope is raised with respect to the road surface on which the vehicle is present, and thus, probing waves are likely to be reflected toward the vehicle.

Furthermore, erroneous detection of an obstacle may result not only from a change in the degree of inclination of the road but also from unevenness of the road surface corresponding to roughness of pavement, minute steps on the road, rain, snow, or the like. When the obstacle sensor erroneously detects an object, an alert is issued based on the erroneous detection to inform of the presence of the obstacle, giving a passenger an uncomfortable or unpleasant feeling.

Solution to Problem

An embodiment provides an obstacle notification apparatus which notifies a driver of presence of an obstacle and which enables reduction in the risk of performing unnecessary notification.

The obstacle notification apparatus of the embodiment is mounted in a vehicle, and includes a probing result acquiring section that sequentially acquires reception intensity of a reflected wave corresponding to a probing wave reflected back by an object, the reflected wave being received by a probing wave transmitting and receiving apparatus transmitting the probing wave in a traveling direction of the vehicle and receiving the reflected wave; an obstacle determining section that determines whether or not an obstacle, which is an object the presence of which a driver of the vehicle is to be notified of, is present in the traveling direction of the vehicle, by using the reception intensity of the reflected wave acquired by the probing result acquiring section; a notification processing section that performs a notification process for notifying the driver of the presence of the obstacle based on determination of the presence of the obstacle by the obstacle determining section; an image data acquiring section that acquires image data taken by a camera including, within an image taking range, an arrival range of the probing wave transmitted by the probing wave transmitting and receiving apparatus; and a noise element detecting section that detects presence of a noise element by analyzing the image data acquired by the image data acquiring section, the noise element being an element which is able to reflect the probing wave and which is preset as an element of which the driver need not be notified. The obstacle determining section determines whether or not the obstacle is present by using a less easily satisfied condition in a case where the noise element detecting section has detected the noise element than that used in a case where the noise element detecting section has not detected the noise element.

BRIEF DESCRIPTION OF THE DRAWINGS

FIG. 1 is a block diagram illustrating an example of a configuration of an obstacle notification system according to a first embodiment;

FIG. 2 is a block diagram illustrating an example of a configuration of a surroundings monitoring ECU in the first embodiment;

FIG. 3 is a diagram illustrating a default threshold value ThD(T);

DESCRIPTION OF THE EMBODIMENTS

First Embodiment

Figure 4:
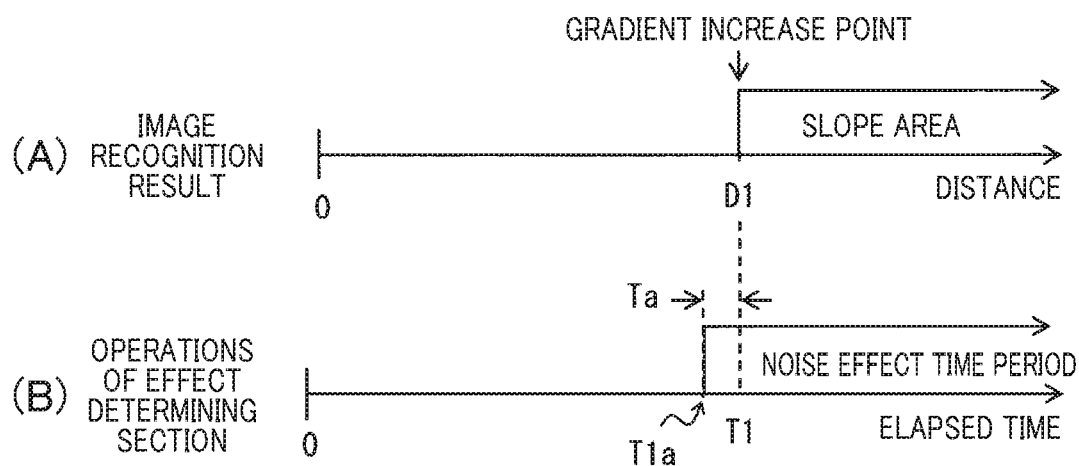
FIG. 4 is a diagram illustrating a noise effect time period.

Hereinafter, the first embodiment of the present invention will be described based on the drawings. An obstacle notification system 100 illustrated in FIG. 1 is mounted in a vehicle, and includes a surroundings monitoring ECU 1, an ultrasonic sensor 2, a camera 3, and a notification apparatus 4. A vehicle in which the obstacle notification system 100 is mounted is hereinafter referred to as an own vehicle. ECU is an abbreviation for Electric Control Unit.

The obstacle notification system 100 is a system configured to notify a driver of an obstacle present in the traveling direction of the own vehicle. Here, by way of example, the obstacle notification system 100 notifies the driver of an obstacle present in front of the own vehicle when the own vehicle is traveling forward. As a matter of course, in another aspect, the obstacle notification system 100 may notify the driver of an obstacle present behind the own vehicle when the own vehicle is reversing. In that case, an installation position, an installation orientation, or the like of the ultrasonic sensor 2 or the camera 3 may be adjusted to allow the driver to be notified of the obstacle present behind the own vehicle. The obstacle as used herein refers to an object the presence of which the driver is to be notified of, for example, an object large enough to prevent traveling of the own vehicle. The configuration of the obstacle notification system 100 in the present embodiment will be described below.

<General Configuration of the Obstacle Notification System>

The surroundings monitoring ECU 1 is connected to the ultrasonic sensor 2, the camera 3, and the notification apparatus 4 via a local area network (hereinafter, simply referred to as LAN: Local Area Network) constructed inside the vehicle, so as to be able to communicate with each of the ultrasonic sensor 2, the camera 3, and the notification apparatus 4. The surroundings monitoring ECU 1 controls operation of the obstacle notification system 100 as a whole. The surroundings monitoring ECU 1 will be described below in detail.

The ultrasonic sensor 2 transmits an ultrasonic pulse serving as a probing wave, with a predetermined transmission cycle, and receives a reflected wave corresponding to the transmitted ultrasonic pulse reflected back from an object present outside the object vehicle. The ultrasonic sensor 2 then sequentially outputs a signal indicative of signal intensity of the received reflected wave, to the surroundings monitoring ECU 1. The ultrasonic sensor 2 corresponds to a probing wave transmitting and receiving apparatus.

Transmission of ultrasonic pulses and reception of reflected waves may be achieved using one oscillation element. As a matter of course, in another aspect, one or more oscillation elements for reception may be provided besides an oscillation element for transmission. The transmission cycle may be, for example, several hundred milliseconds. Here, by way of example, the transmission cycle may be 100 milliseconds.

The ultrasonic sensor 2 may be installed at any position appropriately set in the own vehicle (for example, on a front bumper) so as to transmit ultrasonic pulses to the front of the own vehicle. The front as used herein includes not only a front direction of the vehicle but also an obliquely front direction of the vehicle. The front direction refers to a direction from a rear end of the own vehicle toward a front end thereof.

Here, by way of example, the ultrasonic sensor 2 is provided such that the main direction of the directionality thereof coincides with the front direction of the own vehicle. In another aspect, the ultrasonic sensor 2 may be provided such that the main direction of the directionality thereof is inclined approximately 30° in a vehicle width direction with respect to the front direction.

The directionality of the ultrasonic sensor 2 and the intensity of the transmitted ultrasonic pulses may be adjusted to allow a desired sensing area to be formed. The sensing area refers to a range within which an obstacle can be sensed. The sensing area corresponds to a range within which the ultrasonic sensor 2 can receive a reflected wave from an object with a predetermined size at predetermined reception intensity. The sensing area corresponds to an arrival range. It is noted that a plurality of ultrasonic sensors 2 may be provided.

The camera 3 is an optical type. For example, the camera 3 may be realized using a CMOS camera, a CCD camera or the like. The camera 3 is installed in the vicinity of an upper end of a windshield (for example, near a rear-view mirror) so as to take images of a predetermined range in front of the own vehicle. For convenience of description, the range within which images are taken by the camera 3 is hereinafter also referred to as an image taking range. Image data taken by the camera 3 (hereinafter, referred to as image data) is sequentially provided to the surroundings monitoring ECU 1.

Any appropriate installation position may be set for the camera 3, and the installation position is not limited to the vicinity of the rear-view mirror. The camera 3 may be mounted at a position where the driver's view toward the front of the vehicle is not blocked. However, the camera 3 is assumed to be installed such that the image taking range thereof includes the sensing area of the ultrasonic sensor 2.

In the present embodiment, the camera 3 is an optical type, by way of example. However, in other aspects, the camera 3 may be an infrared camera or a near-infrared camera. The camera 3 may also be a stereo camera.

The notification apparatus 4 outputs information indicating that an obstacle is present in the traveling direction of the own vehicle (in this case, the forward direction), in such a manner that the driver can perceive the information. The notification apparatus 4 may be a display, an indicator such as an LED, a speaker, a vibrator, or the like.

<Configuration and Operation of the Surroundings Monitoring ECU 1>

The surroundings monitoring ECU 1 is configured as a computer, and includes a CPU 11, a RAM 12, a ROM 13, an I/O, and a bus line connecting these components together. The ROM 13 stores, for example, a program allowing an ordinary computer to function as the surroundings monitoring ECU 1 of the present embodiment (hereinafter, referred to as a program for obstacle notification).

In addition, the ROM 13 also stores setting data concerning the ultrasonic sensor 2 and the camera 3. The setting data concerning the ultrasonic sensor 2 is data indicative of the installation position of the ultrasonic sensor 2 in the own vehicle and the sensing area of the ultrasonic sensor 2. The setting data concerning the camera 3 is data indicative of the installation position and the image taking range of the camera 3. The ROM 13 further stores a default threshold value preset as a threshold value used to determine whether or not any obstacle is present based on the reception intensity provided by the ultrasonic sensor 2.

It is noted that the above-described program for obstacle notification may be stored in a non-transitory tangible storage medium such as ROM. Execution of the program for obstacle notification by the CPU 11 corresponds to execution of a method corresponding to the program for obstacle notification.

The surroundings monitoring ECU 1 includes, as shown in FIG. 2, an image data acquiring section F1, an image recognizing section F2, an effect specifying section F3, a probing result acquiring section F4, an obstacle determining section F5, and a notification processing section F6 as functional blocks realized by executing the above-described program for obstacle notification. In addition, the obstacle determining section F5 includes a distance specifying section F51 as a more specialized functional block. Some or all of the functional blocks of the surroundings monitoring ECU 1 may be realized as hardware using one or more ICs or the like. The surroundings monitoring ECU 1 corresponds to an obstacle notification apparatus.

A threshold value storage section M1 shown in FIG. 2 is included in a storage area of the RAM 12 and is an area in which data read from the ROM 13 and indicating the default threshold value is stored. In the present embodiment, a value for the default threshold value is set depending on an elapsed time from the start of transmission of an ultrasonic pulse as illustrated in FIG. 3.

Specifically, the default threshold value used for a period of time from the start of transmission of an ultrasonic pulse until a predetermined reverberation convergence time Tx has elapsed is set to a sufficiently large value in order to prevent the transmitted ultrasonic pulse itself and a reverberation thereof from being erroneously detected as a reflected wave from the object.

It is noted the reverberation as used herein corresponds to an ultrasonic wave resulting from vibration during a period of time from the completion of transmission of the ultrasonic pulse until the oscillation element is immobile. The reverberation attenuates gradually. The time from the start of transmission of the ultrasonic pulse until the reverberation converges, that is, the reverberation convergence time Tx has been specified through real tests, simulation, or the like. A dashed line L1 in FIG. 3 indicates the reception intensity corresponding to the transmitted ultrasonic pulse itself and the reverberation of the transmitted ultrasonic pulse.

Furthermore, a default threshold value for a period of time after the time point when the reverberation convergence time Tx has elapsed since the start of transmission of the ultrasonic pulse is an even-road-surface assumed value Pc obtained by adding a predetermined margin Pb to a value Pa assumed as the reception intensity of a reflected wave from an even road surface. The even road surface as used herein refers to a road surface for which the degree of evenness of a road surface corresponding to roughness of pavement falls within a predetermined allowable range and for which the degree of inclination (in other words, the gradient) is uniform.

The reception intensity Pa for a reflected wave from the even road surface may be specified through real tests, simulation, or the like. The predetermined margin Pb is a value used to restrain the obstacle determining section F5 from erroneously determining the presence of an obstacle based on a reflected wave from the road surface of an actual road. The margin Pb may be appropriately determined in view of the difference in the degree of unevenness between a road surface assumed as an even road surface and an actual road surface, non-uniformity of the gradient of the road surface of the actual road (in other words, the degree of curvature), or the like.

The default threshold value may be represented as a function using, as a variable, an elapsed time T from the start of transmission of an ultrasonic pulse or be represented in a table form. Data indicative of the default threshold value may be represented in any form which allows the default threshold value corresponding to the elapsed time T to be uniquely determined. Here, by way of example, a function indicative of the correspondence relationship between the elapsed time T from the start of transmission of an ultrasonic pulse and the default threshold value is assumed to be expressed as a program. For convenience of description, the default threshold value for a certain elapsed time T is hereinafter also referred to as a default threshold value ThD(T).

Next, various functional blocks will be described. The image data acquiring section F1 sequentially acquires image data from the camera 3. The image recognizing section F2 analyzes the image data acquired by the image data acquiring section F1 to recognize a point of change in the road gradient (hereinafter, referred to as a gradient change point), the gradient of a road surface where the vehicle travels after passage of a gradient change point relative to the road surface on which the vehicle is now traveling, road surface conditions, an object on the road surface, weather conditions, and the like.

The road surface conditions as used herein include, for example, whether or not the road surface is paved, the degree of unevenness of the road surface, whether or not the road surface is covered with water, whether or not any puddle is present on the road surface, and whether or not the road surface is covered with snow. The weather conditions mean whether or not rain, snow, hail, or the like is falling.

A well-known technique may be used as a method for detecting the above-described various elements in image data taken by the camera 3. For example, the technique disclosed in JP-A-2009-133830 may be used to perform detection of gradient change points and estimation of the gradient of the road surface where the vehicle travels after passage of a gradient change point relative to the road surface on which the vehicle is now traveling.

The degree of unevenness of the road surface may be specified using, for example, the disclosure of JP-T-2015-510119. For example, the technique disclosed in Japanese Patent No. 5720380 may be used to determine whether or not the road surface is paved, whether or not the road surface is covered with water, whether or not any puddle is present on the road surface, whether or not the road surface is covered with snow, and the like. Moreover, the weather conditions may be specified by using, for example, the technique disclosed in Japanese Patent No. 5720380.

In addition, the image recognizing section F2 may perform a pattern matching process for image data to detect an object preset as a detection target (hereinafter, referred to as a detection target). Any appropriate detection target may be set. For example, a wall or a guard rail, a utility pole, a human being, a road cone, a curb, a scotch block, or the like may be registered as a detection target.

Various objects or environments detected in image data by the image recognizing section F2 include elements which can reflect ultrasonic pulses and of which the driver need not be notified (hereinafter, referred to as noise elements). The image recognizing section F2 determines whether or not any noise element is present in the sensing area of the ultrasonic sensor 2 (in other words, a noise element is detected).

The noise element is, for example, a road surface on which the degree of unevenness is a predetermined allowable range or more, a gradient increase point corresponding to a gradient change point with the gradient increased, a road extended further from the gradient increase point, a step and a fallen object with a height smaller than a predetermined reference value (for example, several centimeters), a water-covered road, a puddle, snow on the road, and falling rain, snow, and hail.

Among the elements which can be recognized by the image recognizing section F2, those elements which are treated as noise elements may be pre-registered. In the present embodiment, the image recognizing section F2 also detects elements other than the noise elements. However, this is not a limitation. The image recognizing section F2 may be able to detect at least the noise elements. In addition, the image recognizing section F2 need not be configured to be able to detect all the noise elements described above as the noise elements. The image recognizing section F2 may be appropriately configured so as to be able to detect the types of elements defined as the noise elements. The image recognizing section F2 corresponds to a noise element detecting section.

In case of detecting a noise element, the image recognizing section F2 specifies a portion of the sensing area of the ultrasonic sensor 2 in which the noise element is present and also specifies a distance from the ultrasonic sensor 2 to the noise element.

The distance between the noise element and the ultrasonic sensor 2 may be calculated, for example, as follows. First, the image recognizing section F2 specifies the position of the noise element relative to the own vehicle based on the position of the noise element in the image data and the mounting position and image taking range of the camera 3 in the own vehicle. A well-known technique may be used as a technique for estimating the position relative to the vehicle from the position of the object in the image data taken by the in-vehicle camera. Then, the image recognizing section F2 specifies the distance from the ultrasonic sensor 2 to the noise element based on the mounting position of the ultrasonic sensor 2 in the own vehicle and the position of the noise element relative to the own vehicle.

In case of detecting falling rain or snow or the like as a noise element, the image recognizing section F2 determines that the noise element is present all over the sensing area of the ultrasonic sensor 2 and determines the distance from the ultrasonic sensor 2 to the noise element to be 0. The image recognizing section F2 sequentially provides the effect specifying section F3 with information on the area where the noise element is present and the distance from the ultrasonic sensor 2 to the noise element.

If the image recognizing section F2 has detected a noise element in the sensing area of the ultrasonic sensor 2, the effect specifying section F3 specifies a noise effect time period which is included in the elapsed time T from the transmission start timing and during which a reflected wave may be reflected back from the noise element.

Operations of the effect specifying section F3 will be described with reference to FIG. 4. FIG. 4 illustrates, by way of example, operations of the effect specifying section F3 in a case where the image recognizing section F2 detects a gradient increase point at a point corresponding to a distance D1 from the ultrasonic sensor 2. FIG. 4(A) conceptually illustrates the distance between the ultrasonic sensor 2 and a gradient increase point detected by the image recognizing section F2.

In such a case, first, the effect specifying section F3 calculates a round-trip flight time T1 which is a time needed for an ultrasonic pulse to travel back and forth through a zone from the ultrasonic sensor 2 to the gradient increase point, based on the distance D1. The round-trip flight time T1 may have any value obtained by doubling the distance D1 and dividing the product by the speed of sound.

Then, the effect specifying section F3 sets, as the noise effect time period, a time period during which the elapsed time T is equal to or longer than a time T1$a$ obtained by subtracting a predetermined error absorption time Ta from the round-trip flight time T1. The error absorption time Ta may be set as a constant taking into account, for example, a possible error included in the distance D1 from the ultrasonic sensor 2 to the gradient increase point calculated by the image recognizing section F2.

Figure 5:
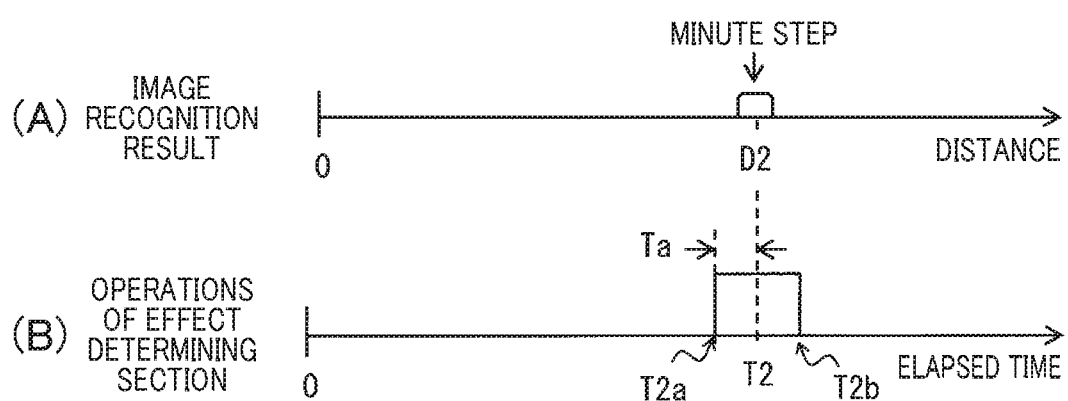
FIG. 5 is a diagram illustrating the noise effect time period.

In another example, with reference to FIG. 5, description will be given which relates to operations of the effect specifying section F3 performed when a minute step with a height of less than the reference value (hereinafter, referred to as a minute step) is detected at a point corresponding to a distance D2 from the ultrasonic sensor 2.

FIG. 5(A) conceptually illustrates the distance D2 between the ultrasonic sensor 2 and the minute step detected by the image recognizing section F2. In such a case, the effect specifying section F3 calculates a round-trip flight time T2 which is a time needed for an ultrasonic pulse to travel back and forth between the ultrasonic sensor 2 and the minute step based on the distance D2 from the ultrasonic sensor 2 to the minute step specified by the image recognizing section F2 and on the speed of sound.

A time period determined with reference to the round-trip flight time T2 is set to be the noise effect time period corresponding to the minute step. Here, by way of example, the noise effect time period is a time period from time Ta obtained by subtracting the error absorption time Ta from the round-trip flight time T2 to time T2b obtained by adding the error absorption time Ta to the round-trip flight time T2.

In the aspect illustrated above, the error absorption time Ta before and after the elapsed time corresponding to the round-trip flight time T2 is set as the noise effect time period. However, this is not a limitation. Any appropriate parameter (for example, the error absorption time Ta) may be set which is used to determine a start time point and an end time point of the noise effect time with respect to the area where the noise element is present. The start time point of the noise effect time period with respect to the area where the noise element is present may be determined according to the time of round-trip flight needed to reach the area. The end time of the noise effect time period may be determined according to the type of the noise element and how far the noise element is present with respect to the ultrasonic sensor 2.

The probing result acquiring section F4 sequentially acquires the reception intensity output by the ultrasonic sensor 2. In addition, the probing result acquiring section F4 also acquires transmission start timing which is timing when the ultrasonic sensor 2 starts transmitting an ultrasonic pulse.

The transmission start timing may be notified by the ultrasonic sensor 2. In addition, in an aspect where the surroundings monitoring ECU 1 itself controls the operation of the ultrasonic sensor 2, the functional block controlling the operation of the ultrasonic sensor 2 may notify the timing to start transmitting an ultrasonic pulse. Moreover, the probing result acquiring section F4 may recognize, as the transmission start timing, timing when the input reception intensity has become equal to or higher than a predetermined threshold value. A threshold value used to specify the transmission start timing may be a value which corresponds to the reception intensity observed during transmission of the ultrasonic pulse and which is large enough not to be observed as a reflected wave.

The obstacle determining section F5 detects an obstacle based on the reception intensity acquired by the probing result acquiring section F4. Operations of the obstacle determining section F5 vary depending on whether or not the image recognizing section F2 has detected a noise element in the sensing area of the ultrasonic sensor 2. First, a case will be described where the image recognizing section F2 has detected no noise element in the sensing area of the ultrasonic sensor 2.

If the image recognizing section F2 has detected no noise element in the sensing area of the ultrasonic sensor 2, the obstacle determining section F5 acquires the transmission start timing from the probing result acquiring section F4, and measures the elapsed time T from the transmission start timing. If the currently input reception intensity exceeds the default threshold value ThD(T) corresponding to the elapsed time T from the transmission start timing, the obstacle determining section F5 determines that an obstacle is present.

Next, a case will be described where the image recognizing section F2 has detected no noise element in the sensing area of the ultrasonic sensor 2. Also when the image recognizing section F2 has detected no noise element in the sensing area of the ultrasonic sensor 2, the obstacle determining section F5 first acquires the transmission start timing from the probing result acquiring section F4, and measures the elapsed time T from the transmission start timing.

The obstacle determining section F5 then determines whether or not the elapsed time T corresponds to the noise effect time period specified by the effect specifying section F3. In this case, if the current elapsed time T does not correspond to the noise effect time period, the obstacle determining section F5 determines whether or not any obstacle is present using the default threshold value ThD(T) corresponding to the current elapsed time T.

On the other hand, if the current elapsed time T corresponds to the noise effect time period, the obstacle determining section F5 determines whether or not any obstacle is present using a threshold value (hereinafter, referred to as a noise associated threshold value) larger than the default threshold value ThD(T) corresponding to the current elapsed time T. For convenience of description, the threshold value used to determine whether or not any obstacle is present is hereinafter also referred to as a threshold value for determination.

The noise associated threshold value may be calculated dynamically by the obstacle determining section F5 based on the default threshold value or may be preset. If the noise associated threshold value is preset, the set noise associated threshold value may be stored in the ROM 13 similarly to the default threshold value.

In the present embodiment, by way of example, the obstacle determining section F5 is assumed to dynamically generate a noise associated threshold value ThN(T) corresponding to the elapsed time T based on the default threshold value ThD(T) corresponding to the current elapsed time T.

By way of example, the noise associated threshold value ThN(T) corresponding to a certain elapsed time T is a value obtained by multiplying the default threshold value ThD(T) corresponding to the elapsed time T by a predetermined coefficient $\alpha$. The scale factor $\alpha$ may be any real number larger than 1. For example, in this case, $\alpha=3$. In another aspect, the noise associated threshold value ThN(T) may be a value obtained by adding a predetermined value $\beta$ to the default threshold value ThD(T). The predetermined value $\beta$ may be any positive value.

Parameters for adjustment such as $\alpha$ and $\beta$ may be adjusted according to the type of the noise element detected by the image recognizing section F2. For example, if the detected noise element is an element which is relatively unlikely to return a reflected wave, a value (for example, 2) smaller than a value (for example, 3) used for an element which is relatively likely to return a reflected wave may be adopted as $\alpha$. Whether or not the element is likely to return a reflected wave may be pre-defined for each noise element. This also applies to $\beta$.

The obstacle determining section F5 determines that an obstacle is present if the currently input reception intensity exceeds the noise associated threshold value ThN(T) corresponding to the elapsed time T from the transmission start timing.

In such an aspect, the obstacle determining section F5 performs obstacle detection using the default threshold value ThD(T) if the image recognizing section F2 has detected no noise element in the sensing area of the ultrasonic sensor 2. On the other hand, the obstacle determining section F5 performs obstacle detection using the noise associated threshold value ThN(T) in a case where the image recognizing section F2 has detected a noise element in the sensing area of the ultrasonic sensor 2 and where the elapsed time T corresponds to the noise effect time period.

In a case of detecting an obstacle, the obstacle determining section F5 also specifies the distance between the detected obstacle and the ultrasonic sensor 2. The distance specifying section F51 of the obstacle determining section F5 is a functional block which specifies the distance between the obstacle and the ultrasonic sensor 2. The distance specifying section F51 specifies the distance from the ultrasonic sensor 2 to the obstacle by multiplying the elapsed time from the transmission start timing until the obstacle is detected by the speed of sound and dividing the product by 2.

The notification processing section F6 cooperates with the notification apparatus 4 in performing a process for notifying the driver of the vehicle of the presence of the obstacle in front of the own vehicle (the process is hereinafter referred to as a notification process). For example, when the notification apparatus 4 is a display, the notification processing section F6 causes the notification apparatus 4 to display an image or a text indicating that the obstacle is present in front of the own vehicle. When the notification apparatus 4 is a loudspeaker, the notification processing section F6 causes the notification apparatus 4 to output an alert sound or a voice message indicating that the obstacle is present in front of the own vehicle.

Moreover, when the notification apparatus 4 is a vibrator, the notification processing section F6 causes the vibrator, which serves as the notification apparatus 4, to vibrate in a preset vibration pattern to inform the driver that the obstacle is present. The vibrator may be provided on a component such as the driver's seat or the steering wheel which comes into contact with the driver's body. That is, the notification processing section F6 performs the alarming process in a manner corresponding to the notification apparatus 4. Information indicating that the obstacle is present in front of the own vehicle may be output in a form which can be perceived by human beings, such as image display, text display, light emission, vibration, or voice (including simple sound).

Any appropriate condition under which the notification processing section F6 performs the notification process may be set. For example, the notification process may be performed if the obstacle is present at a given distance or shorter from the ultrasonic sensor 2. If the obstacle determining section F5 detects an obstacle, the notification process may be performed regardless of the distance between the obstacle and the ultrasonic sensor 2. In any way, the notification process may be performed based on the detection of the obstacle by the obstacle determining section F5.

<Threshold Value Adjusting Process>

Next, with reference to a flowchart illustrated in FIG. 6, a series of processes (hereinafter, referred to as a threshold value determining process) will be described in which the obstacle determining section F5 determines a noise effect threshold value. The set of operations illustrated in the flowchart of FIG. 6 may be performed sequentially (for example, every 100 milliseconds) when the vehicle is supplied with power so as to be able to travel.

First, in step S101, the image data acquiring section F1 acquires image data generated by the camera 3, and the present process proceeds to step S102. In step S102, the image recognizing section F2 uses the image data acquired by the image recognizing section F2 in step S101 to perform an image recognizing process, thereby detecting various elements such as presence or absence of a change in the road surface gradient, the road surface conditions, and the weather conditions. When the processing in step S102 is completed, the present process proceeds to step S103.

In the present embodiment, the image recognizing process is performed for each frame taken by the camera 3. However, this is not a limitation. The image recognizing process may be performed using image data in a plurality of frames. For example, in an aspect, based on image data in three consecutive frames, a super-resolution image may be generated which has a resolution improved using a well-known super resolution technique to detect various elements from the super-resolution image.

In step S103, the image recognizing section F2 determines whether or not any noise element is present in the sensing area of the ultrasonic sensor 2 as a result of the image recognizing process in step S102. If any noise element has been detected in the sensing area of the ultrasonic sensor 2, an affirmative determination is made in step S103, and the present process proceeds to step S104. On the other hand, if no noise element has been detected in the sensing area of the ultrasonic sensor 2, a negative determination is made in step S103, and the present process proceeds to step S105.

In step S104, the effect specifying section F3 specifies the noise effect time period. Then, the obstacle determining section F5 generates a noise associated threshold value ThN(T) used for the noise effect time period based on the default threshold value ThD(T), and the present process is ended. In step S105, the default threshold value is adopted as a threshold value for determination, and the present process is ended.

Summary of the Embodiment

In the above-described configuration, the obstacle determining section F5 performs obstacle detection using the default threshold value if the image recognizing section F2 has detected no noise element in the sensing area of the ultrasonic sensor 2. On the other hand, the obstacle determining section F5 performs obstacle detection using the noise associated threshold value in a case where the image recognizing section F2 has detected a noise element in the sensing area of the ultrasonic sensor 2 and where the elapsed time T corresponds to the noise effect time period.

Figure 7:
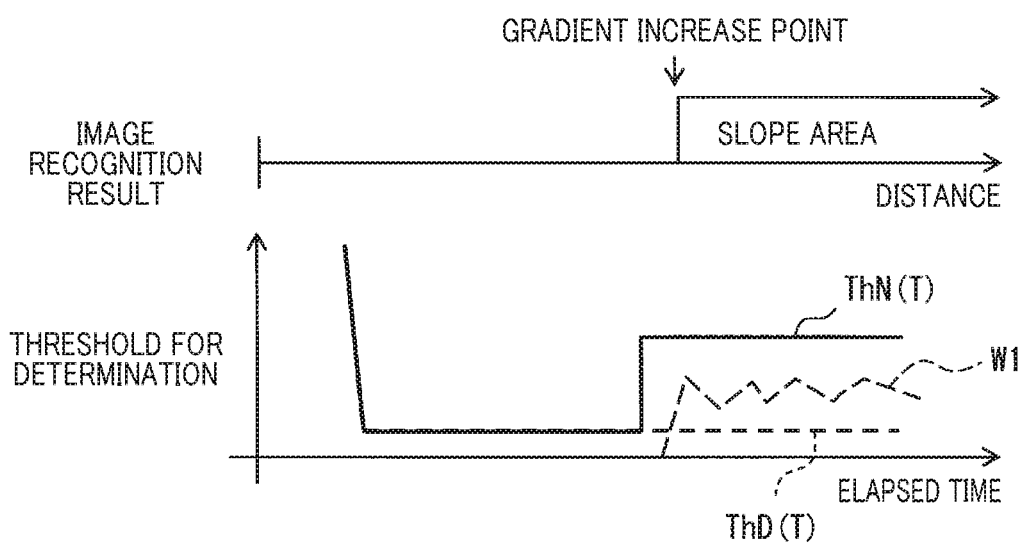
FIG. 7 is a diagram illustrating operation of the obstacle determining section.

Therefore, for example, as illustrated in FIG. 7, even in a situation where a gradient increase point is present in front of the own vehicle, the noise associated threshold value ThN(T) larger than the default threshold value ThD(T) is applied as a threshold value for determination for a time period during which a reflected wave is expected to return from the surface of a road extending farther beyond the gradient increase point. This enables reduction in the risk of erroneous determination of the presence of an obstacle caused by the reflected wave from the road surface. A dashed line W1 in FIG. 7 conceptually indicates transition of the reception intensity of the reflected wave from the road surface.

Figure 8:
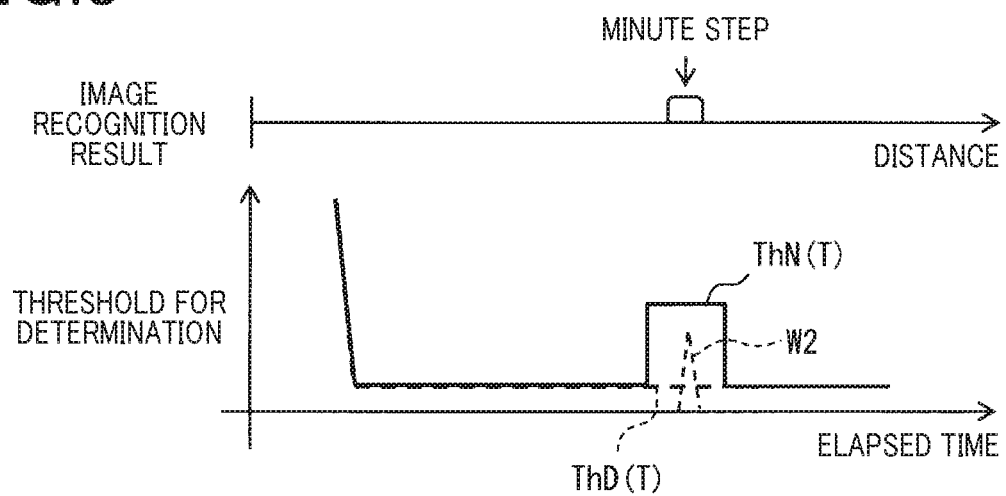
FIG. 8 is a diagram illustrating operation of the obstacle determining section.

In addition, as illustrated in FIG. 8, even in a situation where a minute step is present in front of the own vehicle, the noise associated threshold value ThN(T) larger than the default threshold value ThD(T) is applied as a threshold value for determination for a time period during which a reflected wave is expected to return from the minute step. This enables reduction in the risk of erroneous determination of the presence of an obstacle caused by the reflected wave from the minute step. A dashed line W2 in FIG. 8 conceptually indicates transition of the reception intensity of the reflected wave from the minute step.

That is, the above-described configuration enables reduction in the risk of erroneous determination of the presence of an obstacle caused by the noise element such as the road surface or the minute step. As a result, this enables reduction in the risk of unnecessary notification performed by the notification processing section F6.

Since the noise associated threshold value is larger than the default threshold value, the use of the noise aspect threshold value as the threshold value for determination corresponds to adoption of a less easily satisfied condition as a condition for determining the presence of an obstacle. That is, the above-described embodiment corresponds to an example of an aspect where, if any noise element has been detected, whether or not any obstacle is present is determined using a condition which is satisfied less easily than a condition used when no noise element has been detected.

In addition, in the above-described configuration, if no noise element is present, the obstacle determining section F5 determines whether or not any obstacle is present using the default threshold value. Even if a noise element is present, the obstacle determining section F5 determines whether or not any obstacle is present using the default threshold value for a time period not corresponding to the noise effect time period.

Therefore, with the default threshold value preset to a relatively small value, the presence of an obstacle can be detected with relatively high sensitivity in a situation involving no effect of noise elements. That is, the above-described configuration improves detection sensitivity for an obstacle while suppressing unnecessary notification.

In general, in a time period corresponding to an area far from the ultrasonic sensor 2, a reflected wave from a noise element tends to be received at higher reception intensity. This is because, as an elapsed time from the transmission start timing is longer, an ultrasonic pulse is more extensively propagated through the space and is reflected back from various elements.

Figure 9:
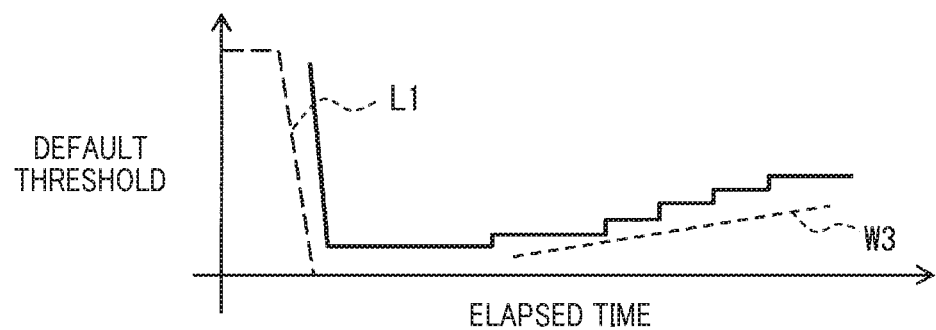
FIG. 9 is a diagram illustrating an assumed configuration.

Thus, in another assumed aspect intended to suppress erroneous detection of an obstacle caused by a noise element and also to suppress unnecessary notification, as illustrated in FIG. 9, the default threshold value is set to a value which increases with the lapse of time (this is referred to as an assumed configuration). A dashed line W3 in FIG. 9 indicates an assumed value of the reception intensity of a reflected wave from a noise element which value varies with the lapse of time (the value is hereinafter referred to as an assumed noise level).

However, in the assumed configuration, the value increases with the distance from the ultrasonic sensor 2, thereby reducing the detection sensitivity for an obstacle present at a location distant from the ultrasonic sensor 2. That is, setting the default threshold value larger than the assumed noise level leads to a reduced software-based range within which an obstacle can be detected.

To solve such a problem, the configuration of the present embodiment changes, if a noise element is present, the threshold value for determination so as to suppress erroneous detection of an obstacle caused by the noise element. Thus, the configuration of the present embodiment allows the default threshold value for the time period corresponding to a remote area to be set to a smaller value than the assumed configuration. That is, compared to the assumed configuration, the configuration of the present embodiment allows formation of a larger software-based (in other words, logical) sensing area.

In the aspect illustrated above, the surroundings monitoring ECU 1 includes the functions of the obstacle determining section F5. However, this is not a limitation. The obstacle determining section F5 may be provided in the ultrasonic sensor 2.

Hereinbefore, the embodiment of the present invention has been described. However, the present invention is not limited to the above-described embodiment, and embodiments and various modifications described below are also included within the technical scope of the present invention. In addition to the following embodiments and modifications, the present invention may be variously modified without departing from the spirit thereof.

[Modification 1-1]

In the aspect of the first embodiment, the default threshold value used after the reverberation convergence time Tx is a constant value. However, this is not a limitation. The default threshold value may be set to increase with the elapsed time T from the transmission start timing as is the case with the assumed configuration.

Also in such an aspect, as is the case with the first embodiment, the noise effect time period may be specified, and if the elapsed time T corresponds to the noise effect time period, the noise associated threshold value may be applied as the threshold value for determination.

Figure 10:
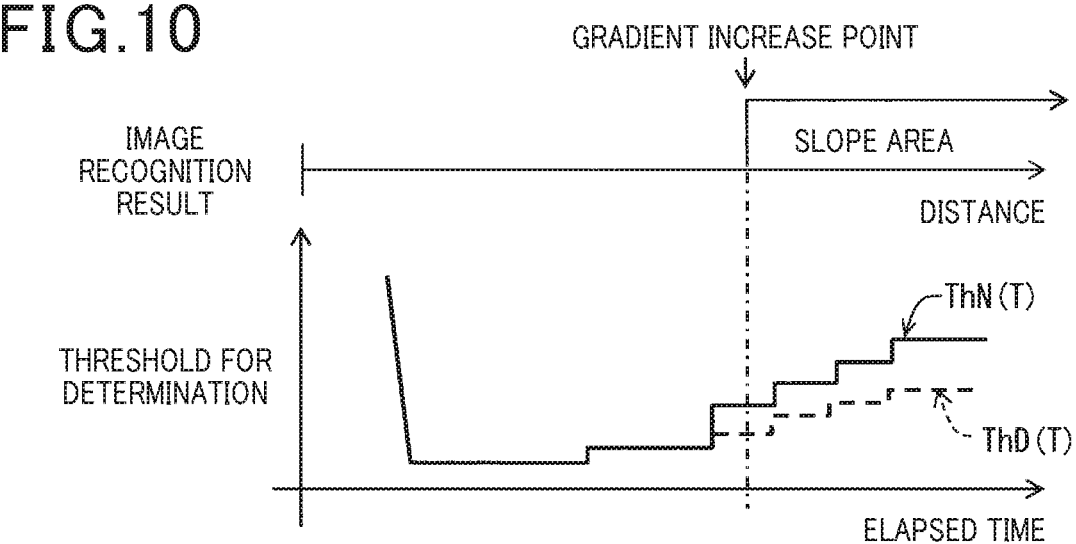
FIG. 10 is a diagram illustrating operation of the obstacle determining section in modification 1.

For example, if the image recognizing section F2 has detected a gradient increase point as the noise element as illustrated in FIG. 10, the effect specifying section F3 specifies the noise effect time period corresponding to the area where the noise element is present. Then, the obstacle determining section F5 determines whether or not any obstacle is present using the noise associated threshold value ThN(T) used for the noise effect time period. In FIG. 10, a solid line indicates the threshold value used for determination, and a dashed line indicates the default threshold value.

[Modification 1-2]

In the aspect disclosed in modification 1 described above, the noise effect time period is specified, and a value different from the default threshold value ThD(T) is adopted as the threshold value for determination only for the noise effect time period. However, this is not a limitation.

The time periods other than the noise effect time period are the time periods during which a reflected wave from the noise element is relatively unlikely to arrive. Therefore, if the default threshold value ThD(T) is set so as to exceed the assumed noise level, a value smaller than the default threshold value ThD(T) may be adopted as the threshold value for determination for the time periods other than the noise effect time period to determine whether or not any obstacle is present.

Figure 11:
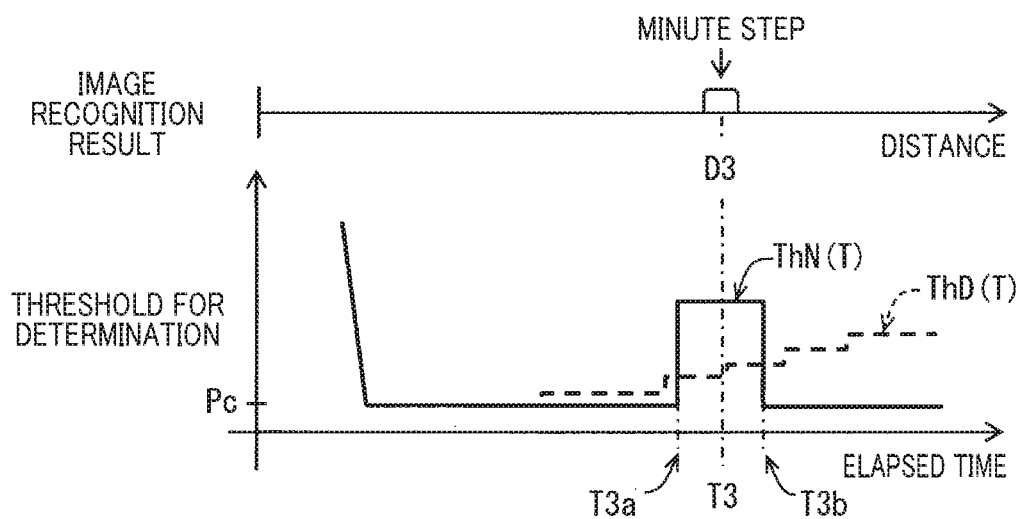
FIG. 11 is a diagram illustrating operation of the obstacle determining section in modification 2.

For example, as illustrated in FIG. 11, for the noise effect time period, a noise suppression threshold value is adopted as the threshold value for determination, whereas, for the time periods other than the noise effect time period, a value smaller than the default threshold value ThD(T) is used as the threshold value for determination. The value used as the threshold value for determination for the time periods other than the noise effect time period may be, for example, an even-road-surface assumed value Pc.

FIG. 11 illustrates that a minute step has been detected as the noise element and that a time period from elapsed time T3a to elapsed time T3b has been specified as the noise effect time period. The elapsed time T3 represents a round-trip flight time corresponding to the distance D3 from the ultrasonic sensor 2 to the minute step.

According to such an aspect, even when the default threshold value is defined so as to increase with the elapsed time T, whether or not any obstacle is present can be determined by using a smaller threshold value if the detection is subjected to no effect of noise elements. That is, modification 1-2 can provide a wider software-based range within which an obstacle can be detected than that in modification 1 described above.

[Modification 1-3]

In the aspect disclosed in the first embodiment, the noise effect time period is specified, and a value larger than the default threshold value is applied as the threshold value for determination for the noise effect time period. However, this is not a limitation. For example, the noise associated threshold value ThN(T) may be applied for all of the elapsed time following the reverberation convergence time Tx.

In addition, the noise associated threshold value ThN(T) may also be applied to the time period preceding the reverberation convergence time Tx. That is, if the image recognizing section F2 has detected a noise element, the noise associated threshold value ThN(T) may be applied to all the time periods. Such an aspect allows omission of the process for specifying the noise effect time period.

Second Embodiment

Next, the second embodiment of the present invention will be described with reference to the drawings. It is noted that components, described below, of the second embodiment having the same functions as those of members constituting the above-described first embodiment and modifications thereof are denoted by the same reference numerals as those in the first embodiment and the modifications thereof, and descriptions thereof are omitted. In addition, if only a part of the configuration is referred to in the present embodiment, the above-described first embodiment and modifications thereof may be applied to the remaining part of the configuration. A difference between the second embodiment and the above-described first embodiment lies in the functions of the surroundings monitoring ECU 1. The difference will mainly be described below.

Figure 12:
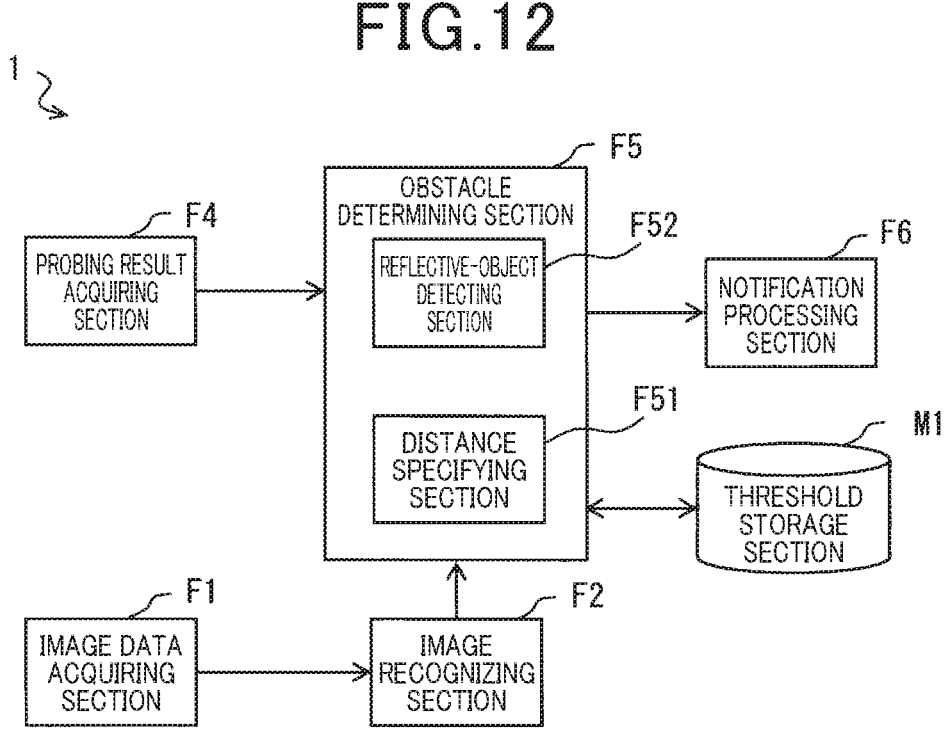
FIG. 12 is a block diagram illustrating an example of a general configuration of a surroundings monitoring ECU in a second embodiment.

The surroundings monitoring ECU 1 in the second embodiment includes, as illustrated in FIG. 12, the image data acquiring section F1, the image recognizing section F2, the probing result acquiring section F4, the obstacle specifying section F5, and the notification processing section F6 as functional blocks. The obstacle determining section F5 includes, as more specialized functional blocks, the distance specifying section F51 and a reflective object detecting section F52. The threshold value storage section M1 stores the default threshold value ThD(T) corresponding to the elapsed time T from the transmission start timing.

The reflective object detecting section F52 is a functional block detecting a reflective object, which is an object reflecting an ultrasonic pulse, based on the reception intensity provided by the probing result acquiring section F4. More specifically, the reflective object detecting section F52 acquires the transmission start timing from the probing result acquiring section F4 and measures the elapsed time T from the transmission start timing. The reflective object detecting section F52 then determines that a reflective object is present if the currently input reception intensity has exceeded the default threshold value ThD(T) corresponding to the elapsed time T from the transmission start timing.

In addition, the distance specifying section F51 specifies a distance to the reflective object based on a duration time from the transmission start timing until the reflective object detecting section F52 detects the reflective object, in other words, the elapsed time T corresponding to the time point when the reflective object detecting section F52 detects the reflective object. The specified distance is temporarily stored in the RAM 12.

Then, the obstacle determining section F5 determines that an obstacle is present in a case of consecutively detecting, the preset fixed number of times, the reflective object at distances which can be considered to be the same. The fixed number of times used herein is changed depending on whether or not the image recognizing section F2 has detected a noise element in the sensing area of the ultrasonic sensor 2.

For convenience of description, the first fixed number of times refers to the fixed number of times adopted when the image recognizing section F2 has detected no noise element in the sensing area of the ultrasonic sensor 2, and the second fixed number of times refers to the fixed number of times adopted when the image recognizing section F2 has detected a noise element in the sensing area of the ultrasonic sensor 2. The first fixed number of times and the second fixed number of times may be appropriately set. Here, by way of example, the first fixed number of times is three, and the second fixed number of times is five. The second fixed number of times may be a value larger than the first fixed number of times. The first fixed number of times corresponds to the first defined number of times, and the second number of times corresponds to the second defined number of times.

Figure 13:
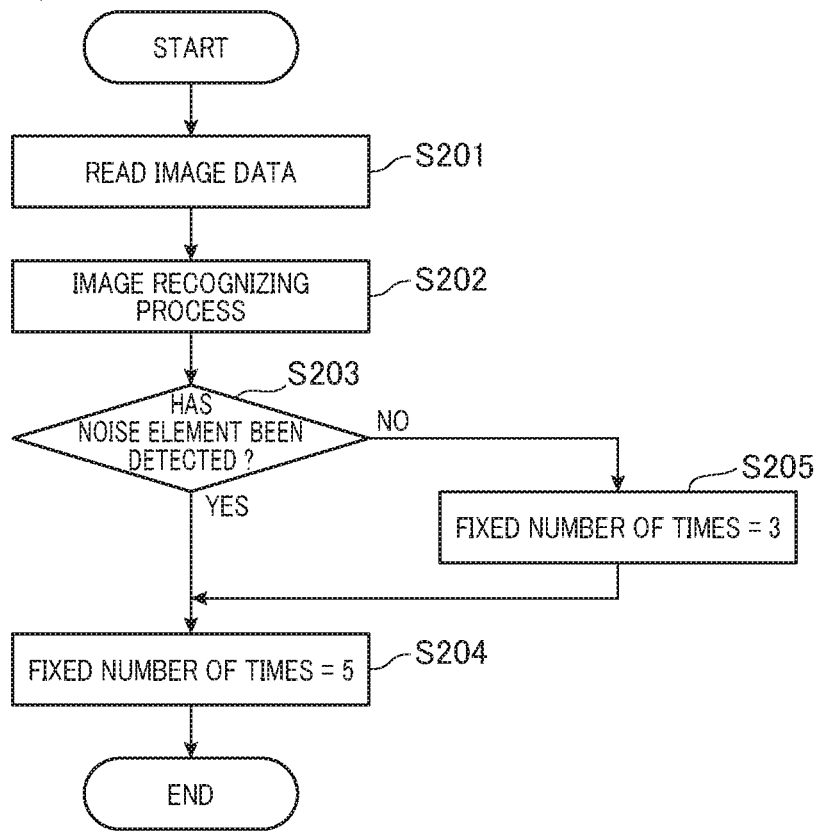
FIG. 13 is a flowchart generally illustrating operation of the surroundings monitoring ECU.

Operations of the surroundings monitoring ECU 1 in the second embodiment will be generally described with reference to the flowchart illustrated in FIG. 13. The set of operations illustrated in the flowchart of FIG. 13 may be performed sequentially (for example, every 100 milliseconds) when the vehicle is supplied with power so as to be able to travel.

Figure 6:
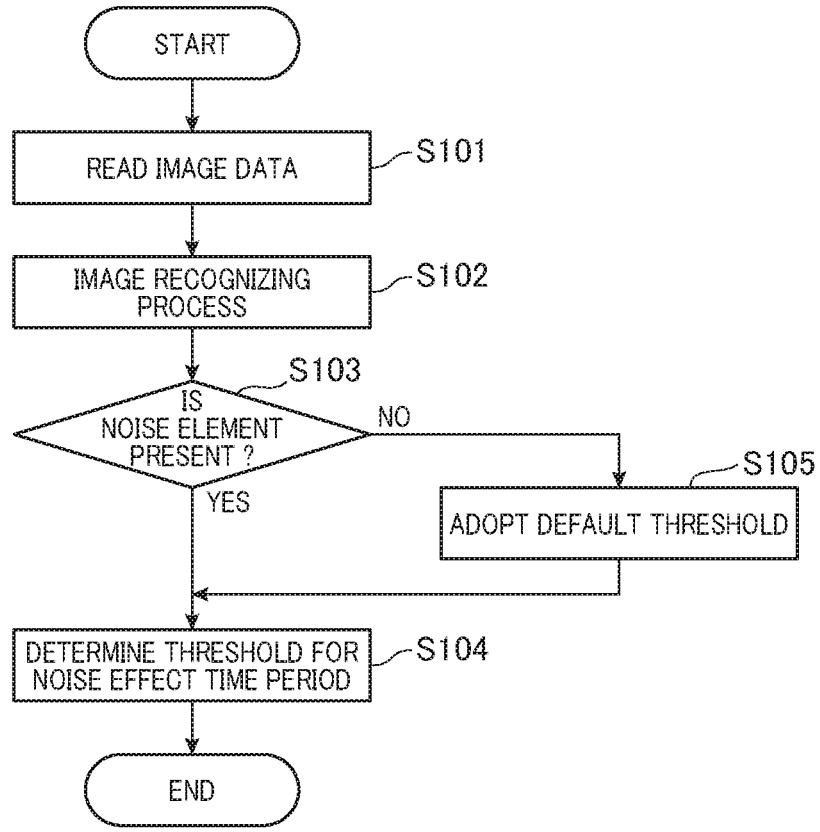
FIG. 6 is a flowchart generally illustrating operation of the surroundings monitoring ECU.

Processing from step S201 to step S203 is similar to the processing from step S101 to step S103 in the flowchart illustrated in FIG. 6. The processing from step S201 to step S203 allows determination of whether or not any noise element is present in the sensing area of the ultrasonic sensor 2. If the presence of a noise element in the sensing area of the ultrasonic sensor 2 is determined in step S203, the determination in step S203 is affirmative, and the present process proceeds to step S204. In contrast, if the presence of a noise element in the sensing area of the ultrasonic sensor 2 is not determined, the determination in step S203 is negative, and the present process proceeds to step S205.

In step S204, the obstacle determining section F5 adopts the second fixed number of times as the fixed number of times, and the present process ends. In contrast, in step S205, the first fixed number of times is adopted as the fixed number of times, and the present process ends.

In the above-described configuration, for a case where the image recognizing section F2 has detected a noise element, the fixed number of times used to determine the presence of an obstacle is set to a larger value than that for a case where the image recognizing section F2 has detected no noise element. In general, the reception intensity of a reflected wave from a noise element is expected to vary with each transmission of an ultrasonic pulse. Hence, the increased fixed number of times enables reduction in the risk of determining a noise element detected as a reflective object to be an obstacle. That is, the above-described configuration can provide effects similar to those of the first embodiment.

The second fixed number of times, which is larger than the first fixed number of times, is used as the fixed number of times to determine the presence of an obstacle, and this corresponds to the adoption of a less easily satisfied condition as a condition for determining the presence of an obstacle. That is, the above-described second embodiment corresponds to an example of an aspect in which, when a noise element has been detected, whether or not any obstacle is present is determined by using a less easily satisfied condition than that used when no noise element has been detected.

Third Embodiment

Figure 14:
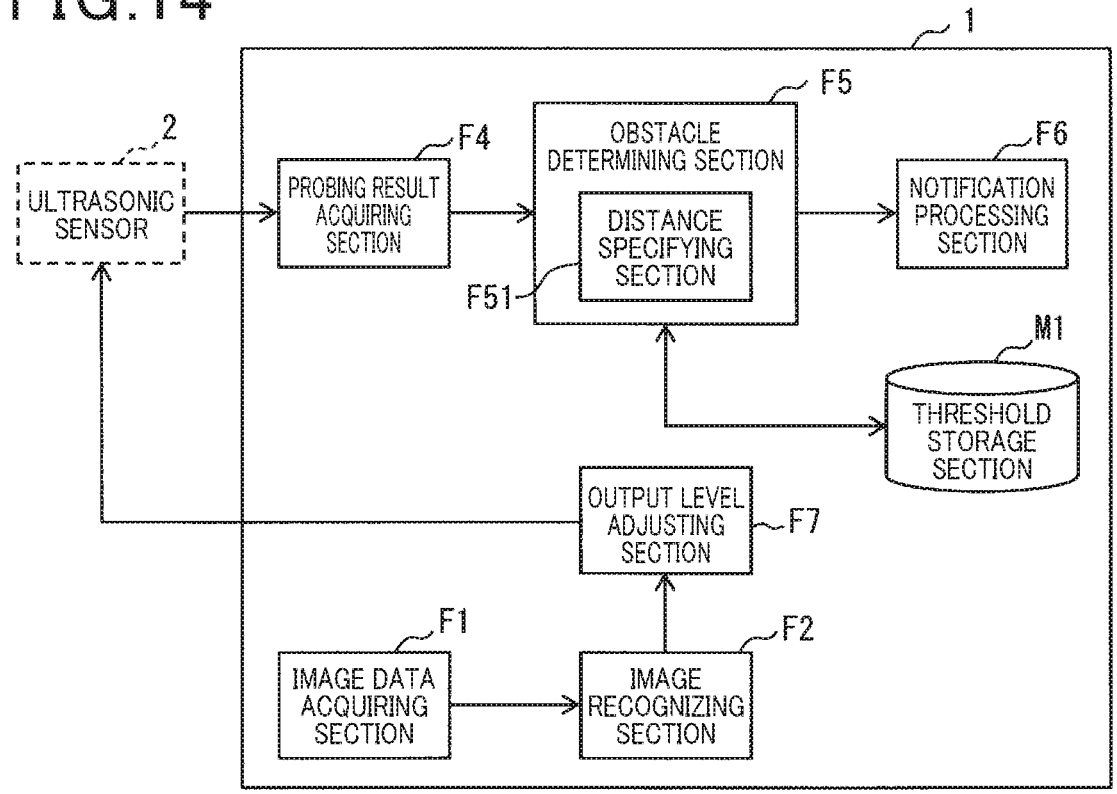
FIG. 14 is a block diagram illustrating an example of a configuration of a surroundings monitoring ECU in a third embodiment.

Next, the third embodiment of the present invention will be described with reference to the drawings. Similarly to the above-described embodiments and modifications thereof, the third embodiment also includes the surroundings monitoring ECU 1, the ultrasonic sensor 2, the camera 3, and the notification apparatus 4. The surroundings monitoring ECU 1 in the present embodiment includes, as functional blocks, the image data acquiring section F1, the image recognizing section F2, the probing result acquiring section F4, the obstacle determining section F5, the notification processing section F6, and an output level adjusting section F7, as illustrated in FIG. 14.

The output level adjusting section F7 changes signal intensity (hereinafter, referred to as an output level) of the ultrasonic pulses transmitted by the ultrasonic sensor 2. It is noted that the ultrasonic sensor 2 in the present embodiment is assumed to be configured to be able to adjust the output level for ultrasonic pulses.

In the present embodiment, the ultrasonic sensor 2 is configured such that the output level for ultrasonic pulses can be set to one of two levels including a preset rated level and a reduced level lower than the rated level. The reduced level may be any level lower than the rated level and may be set to any appropriate value. The ROM 13 stores data indicative of the sensing area used when the output level of the ultrasonic sensor 2 is set to the rated level.

Changing the output level may be achieved by adjusting a driving voltage for the ultrasonic sensor 2. In addition, the output level may be reduced by shifting the frequency of a signal input to the oscillation element from a resonant frequency of the oscillation element by a constant amount (hereinafter, referred to as a frequency for reduction). The frequency for reduction is a frequency at which the output level is set to the reduced level.

Figure 15:
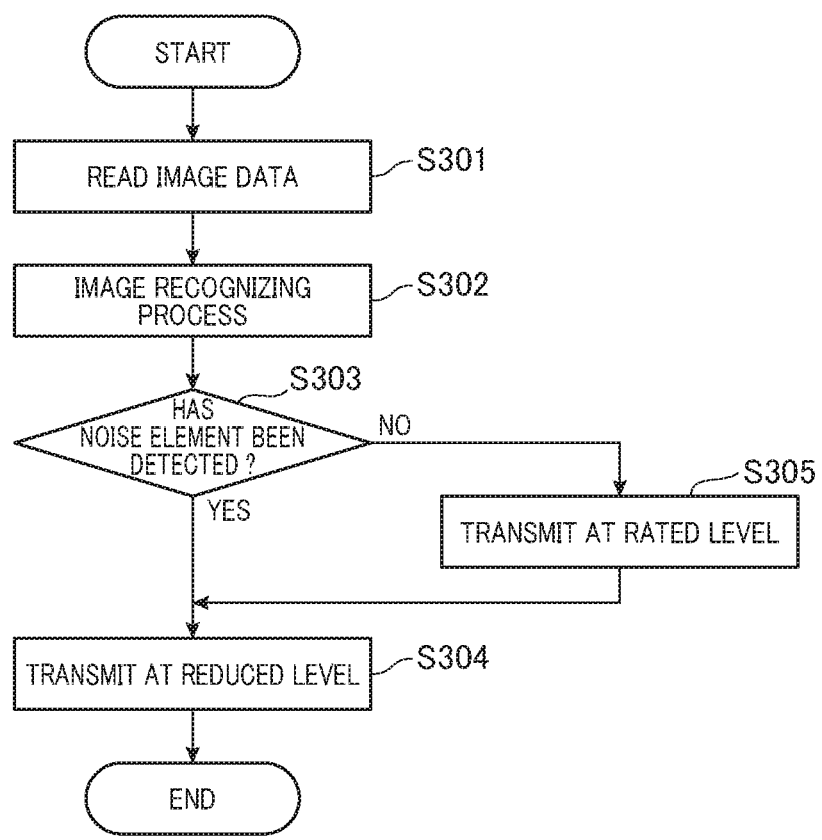
FIG. 15 is a flowchart generally illustrating operation of the surroundings monitoring ECU.

Operations of the output level adjusting section F7 will be described with reference to the flowchart illustrated in FIG. 15. The set of operations illustrated in the flowchart of FIG. 15 may be performed sequentially (for example, every 100 milliseconds) when the vehicle is supplied with power so as to be able to travel.

Processing from step S301 to step S303 is similar to the processing from step S101 to step S103 in the flowchart illustrated in FIG. 6. The processing from step S301 to step S303 allows determination of whether or not any noise element is present in the sensing area used when the output level of the ultrasonic sensor 2 is set to the rated level. If the presence of a noise element is determined in step S303, the determination in step S303 is affirmative, and the present process proceeds to step S304. In contrast, if the presence of a noise element in the sensing area of the ultrasonic sensor 2 is not determined, the determination in step S303 is negative, and the present process proceeds to step S305.

In step S304, the output level adjusting section F7 sets the output level to the reduced level, and the present process ends. In contrast, in step S305, the output level is set to the rated level, and the present process ends.

In the above-described configuration, ultrasonic pulses are transmitted at the rated level if the image recognizing section F2 has detected no noise element, whereas ultrasonic pulses are transmitted at the reduced level if the image recognizing section F2 has detected a noise element. Reducing the output level corresponds to reducing the sensing area of the ultrasonic sensor 2. That is, the obstacle notification system 100 of the present embodiment uses a smaller sensing area when the image recognizing section F2 has detected a noise element than that used when the image recognizing section F2 has detected no noise element.

As will be understood, a reduced sensing area enables reduction in the risk of erroneous determination of the presence of an obstacle caused by a noise element such as a road surface following a gradient increase point located far from the own vehicle. As a result, similarly to the above-described various embodiments and modifications, the present embodiment enables reduction in the risk of performing an unwanted notification process.

[Other Modifications]

In the above-described aspects, an ultrasonic sensor is used as a sensor configured to detect an obstacle present around the own vehicle (hereinafter, referred to as an obstacle sensor). However, this is not a limitation. The obstacle sensor may be a millimeter-wave radar using millimeter waves (including quasi-millimeter waves) as probing waves or a laser radar using light as probing waves. That is, the probing wave transmitting and receiving apparatus may be an apparatus other than the ultrasonic sensor, such as a millimeter-wave radar or a laser radar.

An obstacle notification apparatus of one embodiment is mounted in a vehicle, and includes: a probing result acquiring section (F4) that sequentially acquires reception intensity of a reflected wave corresponding to a probing wave reflected back by an object, the reflected wave being received by a probing wave transmitting and receiving apparatus transmitting the probing wave in a traveling direction of the vehicle and receiving the reflected wave; an obstacle determining section (F5) that determines whether or not an obstacle, which is an object presence of which a driver of the vehicle is to be notified of, is present in the traveling direction of the vehicle, by using the reception intensity of the reflected wave acquired by the probing result acquiring section; a notification processing section (F6) that performs a notification process for notifying the driver of the presence of the obstacle based on determination of the presence of the obstacle by the obstacle determining section; an image data acquiring section (F1) that acquires image data taken by a camera including, within an image taking range, an arrival range of the probing wave transmitted by the probing wave transmitting and receiving apparatus; and a noise element detecting section (F2) that detects presence of a noise element by analyzing the image data acquired by the image data acquiring section, the noise element being an element which is able to reflect the probing wave and which is preset as an element of which the driver need not be notified. The obstacle determining section determines whether or not the obstacle is present by using a less easily satisfied condition in a case where the noise element detecting section has detected the noise element than that used in a case where the noise element detecting section has not detected the noise element.

In the above-described configuration, the noise element detecting section detects a noise element by analyzing the image data from the camera. Then, the obstacle determining section determines whether or not an obstacle is present by using a less easily satisfied condition in a case where the noise element detecting section has detected a noise element than that used in a case where the noise element detecting section has detected no noise element.

That is, in the above-described configuration, a less easily satisfied condition is used as a condition under which an obstacle is present when the noise element detecting section has detected a noise element. This makes the presence of an obstacle unlikely to be determined. As a result, the risk of performing unnecessary notification can be reduced.

An obstacle notification apparatus of another embodiment is mounted in a vehicle, and includes: a probing result acquiring section (F4) that sequentially acquires reception intensity of a reflected wave corresponding to a probing wave reflected back by an object, the reflected wave being received by a probing wave transmitting and receiving apparatus transmitting the probing wave in a traveling direction of the vehicle and receiving the reflected wave; an obstacle determining section (F5) that compares a default threshold value preset to determine presence of an obstacle, which is an object presence of which a driver of the vehicle is to be notified of, with the reception intensity of the reflected wave acquired by the probing result acquiring section, and that, in a case where the reflected wave exceeds the default threshold value, determines that the obstacle is present; a notification processing section (F6) that performs a notification process for notifying the driver of the presence of the obstacle based on the determination of the presence of the obstacle by the obstacle determining section; an image data acquiring section (F1) that acquires image data taken by a camera including, within an image taking range, an arrival range of the probing wave transmitted by the probing wave transmitting and receiving apparatus; a noise element detecting section (F2) that detects presence of a noise element by analyzing the image data acquired by the image data acquiring section, the noise element being an element which is able to reflect the probing wave and which is preset as an element of which the driver need not be notified, and; an output level adjusting section (F7) that adjusts, in a case where the noise element detecting section has detected the noise element, an output level for the probing wave to a level lower than a rated level preset as an output level used for a case where the noise element detecting section has not detected the noise element. The probing wave transmitting and receiving apparatus transmits the probing wave at the output level set by the output level adjusting section.

In the above-described configuration, the probing wave transmitting and receiving apparatus transmits the probing wave at the predetermined rated level if the noise element detecting section has detected no noise element, and transmits the probing wave at the output level lower than the rated level if the noise element detecting section has detected a noise element.

As will be understood, the reduced output level reduces the reception intensity of a reflected wave from the noise element. This enables reduction in the risk of erroneous determination of the presence of an obstacle caused by reception of the reflected wave from the noise element. As a result, the present embodiment enables reduction in the risk of performing unnecessary notification.

REFERENCE SIGNS LIST

100: obstacle notification system,
1: surroundings monitoring ECU (obstacle notification apparatus),
2: ultrasonic sensor (probing wave transmitting and receiving apparatus),
3: camera,
4: notification apparatus,
11: CPU,
12: RAM,
13: ROM,
F1: image data acquiring section,
F2: image recognizing section (noise element detecting section),
F3: effect specifying section,
F4: probing result acquiring section,
F5: obstacle determining section,
F6: notification processing section,
F7: output level adjusting section,
F51: distance specifying section,
F52: reflective object detecting section,
M1: threshold value storage section

The invention claimed is:

1. An obstacle notification apparatus mounted in a vehicle, the obstacle notification apparatus comprising:
   a probing result acquiring section that sequentially acquires reception intensity of a reflected wave corresponding to a probing wave reflected back by an object, the reflected wave being received by a probing wave transmitting and receiving apparatus transmitting the probing wave within a sensing area of the vehicle and in a traveling direction of the vehicle and receiving the reflected wave;
   an obstacle determining section that determines whether or not an obstacle, which is an object, a presence of which a driver of the vehicle is to be notified of, is present in the traveling direction of the vehicle, by using the reception intensity of the reflected wave acquired by the probing result acquiring section;
   a notification processing section that performs a notification process for notifying the driver of the presence of the obstacle based on determination of the presence of the obstacle by the obstacle determining section;
   an image data acquiring section that acquires image data taken by a camera including, within an image taking range, an arrival range of the probing wave transmitted by the probing wave transmitting and receiving apparatus; and
   a noise element detecting section that detects presence of a noise element within the sensing area of the vehicle by analyzing the image data acquired by the image data acquiring section, the noise element being another object that is able to reflect the probing wave, and the noise element being preset as an object that the driver need not be notified about,
   wherein
   the obstacle determining section determines whether or not the obstacle is present by using a threshold, and
   in a case where the noise element detecting section has detected the noise element, the threshold is higher than that used in a case where the noise element detecting section has not detected the noise element.

2. The obstacle notification apparatus according to claim 1, wherein the obstacle determining section compares a threshold value used to determine whether or not the obstacle is present with the reception intensity of the reflected wave acquired by the probing result acquiring section, and in a case where the reception intensity of the reflected wave exceeds the threshold value, determines that the obstacle is present,
- a default threshold value is preset which serves as the threshold value to be used in the case where the noise element detecting section has not detected the noise element,
- the obstacle determining section determines whether or not the obstacle is present by using the default threshold value in the case where the noise element detecting section has not detected the noise element, and
- the obstacle determining section determines whether or not the obstacle is present by using a threshold value larger than the default threshold value in the case where the noise element detecting section has detected the noise element.

3. The obstacle notification apparatus according to claim 2, wherein the default threshold value is set to a value corresponding to an elapsed time from transmission of the probing wave,
- the noise element detecting section specifies an area which is included within the arrival range and in which the noise element is present,
- the obstacle determining section determines whether or not the obstacle is present by using the default threshold value corresponding to the elapsed time from the transmission of the probing wave in a case where the elapsed time does not correspond to a time period corresponding to the area in which the noise element specified by the noise element detecting section is present, and
- the obstacle determining section determines whether or not the obstacle is present by using a threshold value larger than the default threshold value corresponding to the elapsed time from the transmission of the probing wave in a case where the elapsed time corresponds to the time period corresponding to the area in which the noise element specified by the noise element detecting section is present.

4. The obstacle notification apparatus according to claim 3, wherein the obstacle determining section determines whether or not the obstacle is present by using, as the threshold value, an even-road-surface assumed value obtained by adding a predetermined margin to a value assumed as the reception intensity acquired by the probing result acquiring section in a situation where a road surface present in the traveling direction of the vehicle has a uniform degree of inclination, in the case where the elapsed time from the transmission of the probing wave does not correspond to the time period corresponding to the area in which the noise element specified by the noise element detecting section is present.

5. The obstacle notification apparatus according to claim 3, wherein the default threshold value is set to an even-road-surface assumed value which is a value obtained by adding a predetermined margin to a value assumed as the reception intensity acquired by the probing result acquiring section in a case where a road surface present in the traveling direction of the vehicle has a uniform degree of inclination, for a time period following a time point when reverberation involved in the transmission of the probing wave converges.

6. The obstacle notification apparatus according to claim 3, further comprising an effect specifying section that specifies, as a time period corresponding to the area in which the noise element is present, a noise effect time period which is a time period during which the reflected wave from the noise element specified by the noise element detecting section returns, based on a position of the area in which the noise element is present relative to the vehicle and a position in the vehicle at which the probing wave transmitting and receiving apparatus is installed.

7. The obstacle notification apparatus according to claim 1, the obstacle determining section further comprising:
- a reflective-object detecting section that detects presence of a reflective object, which is an object reflecting the probing wave, based on the reception intensity of the reflected wave exceeding a threshold value preset for the reception intensity of the reflected wave to detect the presence of the obstacle; and
- a distance specifying section that specifies a distance from the probing wave transmitting and receiving apparatus to the reflective object detected by the reflective-object detecting section based on a duration time from transmission of the probing wave until the reflected wave corresponding to the reflective object is received,
- the obstacle determining section determines that the obstacle is present in a case where the reflective-object detecting section has consecutively detected the reflective object a predetermined first fixed number of times, at distances which are enabled to be considered as the same distance, in the case where the noise element detecting element has not detected the noise element, and
- the obstacle determining section determines that the obstacle is present in a case where the reflective-object detecting section has consecutively detected the reflective object a second fixed number of times larger than the first fixed number of times, at distances which are enabled to be considered as the same distance, in the case where the noise element detecting element has detected the noise element.

8. The obstacle notification apparatus according to claim 1, wherein
- the probe wave is transmitted from an ultrasonic sensor mounted on the vehicle and the reflected wave is received by the ultrasonic sensor, and
- the noise element detecting section determines a distance from the ultrasonic sensor to the noise element.

9. The obstacle notification apparatus according to claim 8, wherein
- the noise element detecting section determines the distance from the ultrasonic sensor to the noise element based on a position of the noise element in the image data relative to the vehicle and a mounting position of the camera.

10. An obstacle notification apparatus mounted in a vehicle, the obstacle notification apparatus comprising:
- a probing result acquiring section that sequentially acquires reception intensity of a reflected wave corresponding to a probing wave reflected back by an object, the reflected wave being received by a probing wave transmitting and receiving apparatus transmitting the probing wave within a sensing area of the vehicle and in a traveling direction of the vehicle and receiving the reflected wave;
- an obstacle determining section that compares a default threshold value preset to determine presence of an obstacle, which is an object presence of which a driver of the vehicle is to be notified of, with the reception intensity of the reflected wave acquired by the probing result acquiring section, and that, in a case where the reflected wave exceeds the default threshold value, determines that the obstacle is present;

a notification processing section that performs a notification process for notifying the driver of the presence of the obstacle based on the determination of the presence of the obstacle by the obstacle determining section;

an image data acquiring section that acquires image data taken by a camera including, within an image taking range, an arrival range of the probing wave transmitted by the probing wave transmitting and receiving apparatus;

a noise element detecting section that detects a presence of a noise element within the sensing area of the vehicle by analyzing the image data acquired by the image data acquiring section, the noise element being is able to reflect the probing wave, and the noise element being preset as an object that the driver need not be notified about; and an output level adjusting section that adjusts, in response to the noise element detecting section having detected the noise element, an output level for the probing wave to a level lower than a rated level that is preset as an output level used for a case where the noise element detecting section has not detected the noise element, wherein the probing wave transmitting and receiving apparatus transmits the probing wave at the output level set by the output level adjusting section.

\* \* \* \* \*